E. ACHA.
TIRE RIM.
APPLICATION FILED OCT. 11, 1919.

1,371,063.

Patented Mar. 8, 1921.

WITNESSES

INVENTOR
EDUARDO ACHA.
BY
ATTORNEYS

UNITED STATES PATENT OFFICE.

EDUARDO ACHA, OF SAN JUAN, PORTO RICO.

TIRE-RIM.

1,371,063.   Specification of Letters Patent.   Patented Mar. 8, 1921.

Application filed October 11, 1919. Serial No. 329,921.

*To all whom it may concern:*

Be it known that I, EDUARDO ACHA, a citizen of the United States, and a resident of San Juan, Porto Rico, have invented new and Improved Tire-Rims, of which the following is a full, clear, and exact description.

This invention relates in general to tire rims and has reference more particularly to a demountable rim for supporting pneumatic or the like tires on the wheels of vehicles.

A primary object of the invention is to provide an improved tire supporting rim which will greatly facilitate changing an incapacitated tire for a perfect one without the usual laborious manipulation of the tire and the rim.

A further object of the invention is to so construct the rim that it may be manufactured relatively cheap at the same time, rendering it capable of carrying out its intended use with the greatest efficiency.

Figure 1:
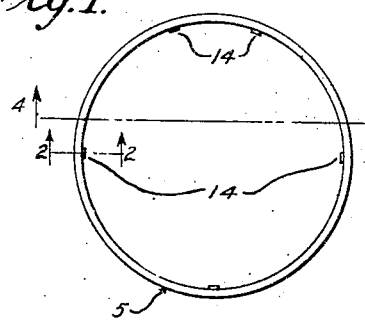
Figure 2:
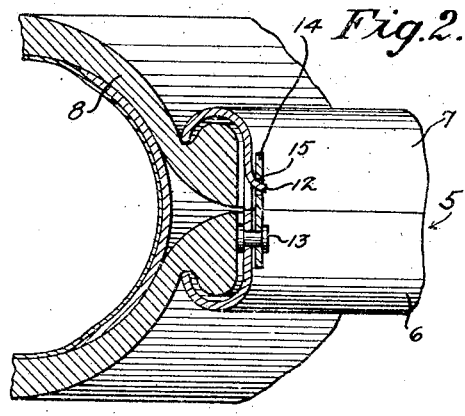
Figure 3:
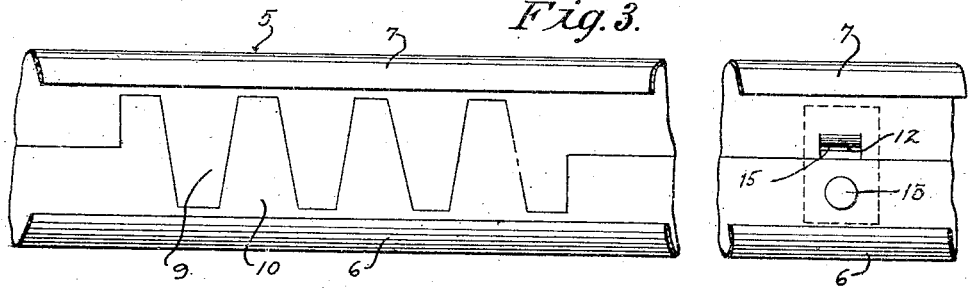
Figure 4:
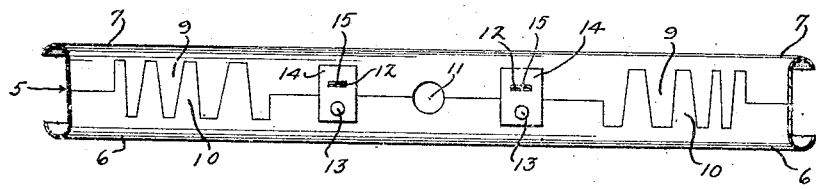

With these and other objects in view the invention will be further described with reference to the accompanying drawing in which Figure 1 is a side elevation of a rim constructed in accordance with the invention, Fig. 2 is a view on the line 2—2, Fig. 1; Fig. 3 is a plan view of the rim showing the interengaging parts; and Fig. 4 is a plan view of the inside of the rim.

Referring to the drawing in detail the arrangement contemplated by the invention consists of a rim 5 comprising a channel constructed by two parts, 6 and 7, which are divided circumferentially and capable of lateral separation to release or receive the tire 8 as occasion demands. In order to prevent circumferential movement of one part to the other the confronting edges of the parts are provided with inter-engaging fingers 9 and 10, spaced at intervals along the confronting edges of the parts. The fingers being so arranged as to leave a space between two of them on one part which is adapted to receive a finger on the other part, and vice versa. These fingers as stated are spaced along the confronting edges of the parts in so-called groups. A suitable opening 11 is provided in the rim to receive the valve stem of a pneumatic tire as is customary in rims of this kind.

To enable the parts to be locked together as well as laterally separated when need be a plurality of locking means are provided on the periphery of the rim and preferably on each side of each group of the inter-engaging fingers 9 and 10. These locking means preferably comprise lugs 12 cut or stamped from the edge of one part of the rim, the lugs being bent downwardly. Pivoted to the other part of the rim by the pins 13 and directly opposite the lugs 12 are the plates 14, which are arranged to over-lap the lugs with slots 15 in the plates made to receive the lugs whereby the parts may be detachably connected. The lugs are capable of springing, if necessary, to engage the slots 15 and the plates 14 are also of spring metal so that a tire may be inserted beween them and the rim to spring the same free from engagement with the lugs 12, and when so disengaged they may be rotated about their pivots 13 to and from over-lapping relation relative to the lugs 12.

I claim:

1. A tire rim comprising two parts having interengaging fingers with a socket adjacent each finger, said fingers being arranged in spaced groups and arranged along the confronting edges of the respective parts so that the openings in one part will engage the fingers of the adjacent part, and a snap fastening member arranged adjacent each end of each group for locking said parts together.

2. A tire rim comprising two annular parts or members having inter-engaging fingers arranged in groups at spaced intervals, one of said parts having a struckup lug adjacent each end of each of said groups of fingers, a double-headed pin mounted in the other of said parts opposite each of said lugs, and a resilient plate rotatably held in place by said pin formed with an opening through which said lug is forced when set and the parts are brought together so that said fingers will inter-engage.

EDUARDO ACHA.